Sept. 5, 1944.  E. ROLLMANN  2,357,360
PROCESS AND APPARATUS FOR THE MANUFACTURE OF MOLDED RUBBER FOOTWEAR
Filed Oct. 23, 1939
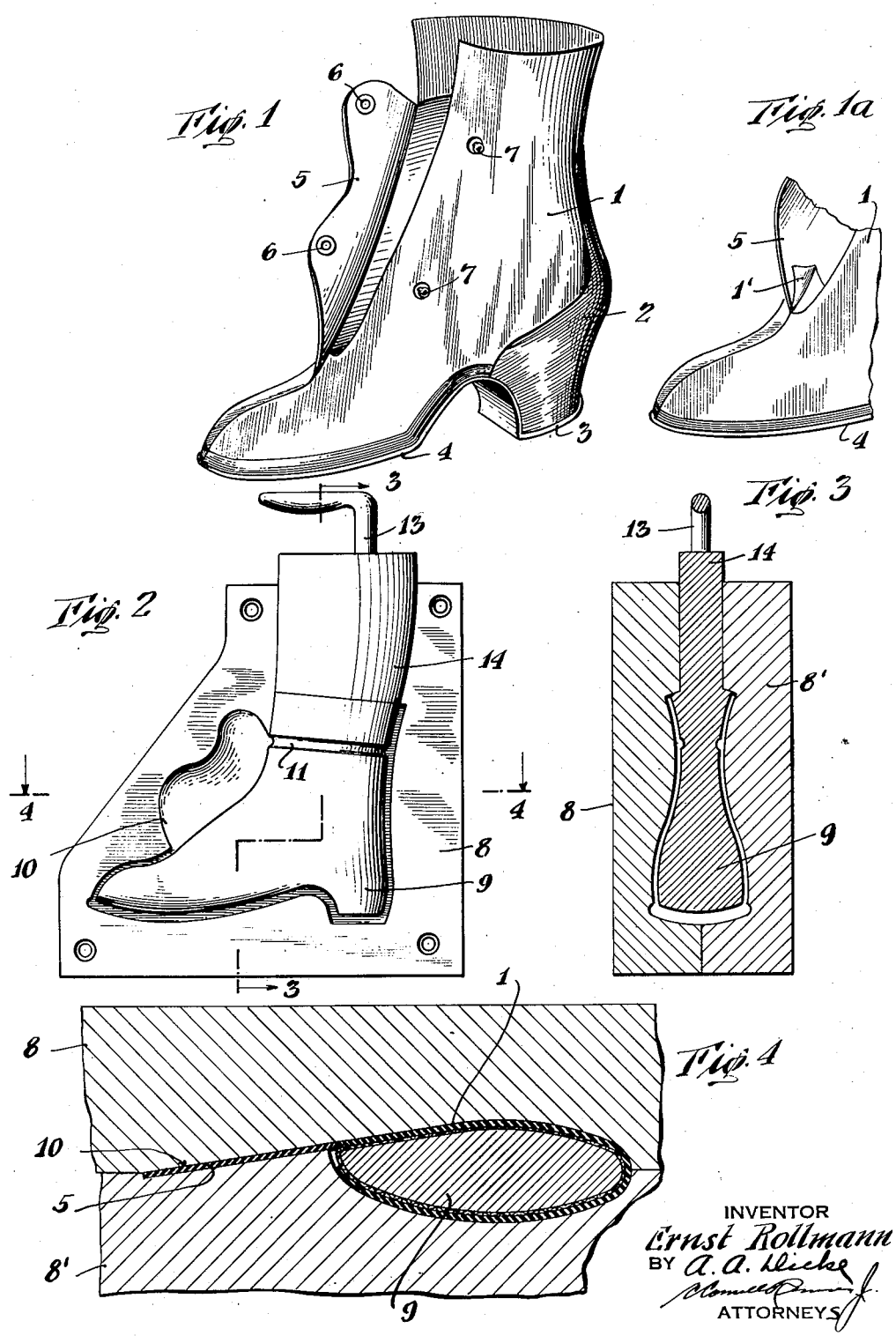
INVENTOR
Ernst Rollmann
BY
ATTORNEYS Patented Sept. 5, 1944

2,357,360

UNITED STATES PATENT OFFICE 2,357,360

PROCESS AND APPARATUS FOR THE MANUFACTURE OF MOLDED RUBBER FOOTWEAR

Ernst Rollmann, Brussels, Belgium, assignor to Heinz Rollmann, Kew Gardens, N. Y.

Application October 23, 1939, Serial No. 300,761
In Great Britain November 12, 1938

2 Claims. (Cl. 18—42)

This invntion relates to an improved process and apparatus for the manufacture of molded rubber footwear, and has for an object to provide an improved process and apparatus for the manufacture of such footwear especially of the type which is covered inside with lining material. Such footwear, for example ladies' overshoes, has been composed hitherto by the assembling of various rubber sheets previously cut to size and then vulcanized in the autoclave. This process has the disadvantage that comparatively a lot of machinery operations are required for the manufacture and the cutting of the rubber sheets and many manual operations are necessitated for the assembling of the cut parts.

It has already been proposed to manufacture rubber footwear by molding, but so far the possibility of employing the cheap and simple molding process was limited to such cases where the upper of the footwear had no overlapping parts or flaps, for instance to ordinary bathing shoes or men's walking shoes.

The invention makes it possible for the first time to manufacture shoes by molding where certain parts of the upper overlap other parts, when the shoe is finished and fastened. This result is obtained by molding the shoe over a last serving as molding core which shoe as compared to the desired shape of the finished fastened article shows flaps and other deformations in such a manner that during the process of molding no parts overlap in the direction of the pressing movement.

It is significant for the formation of the flap according to the invention, that not only the molding core as compared to the desired shape of the finished article is fitted with a projection, the size of which may correspond to the fastening flap of the shoe, but that also those parts of the molding core at the source of the fastening flap are deformed. As a rule these deformations consist in the fact that the cross section of the molding core as compared to that of the shape of the finished article is diminished on that side, where the fastening flap is attached and enlarged on the side of the upper, which is covered by the fastening flap.

The proper kind and degree of the deformation is ascertained by opening and deforming a model shoe, which has the desired shape of the finished article, in such a manner that any overlapping in the direction of the pressing movement, which usually lies transverse to the longitudinal plane of the shoe, is avoided.

A molding of this model shoe in the deformed state can then serve as model for the manufacture of the mold parts.

From the foregoing it results, that the shoe according to the invention in the open state differs from other footwear, manufactured for example from assembled rubber sheets, by characteristic deformations especially at the source of the fastening flap.

Other details of the invention, the special process for the manufacture of the shoes, and the mold are further explained in the following by means of the drawing.

The drawing shows in Fig. 1 a perspective view of an overshoe manufactured according to the invention.

Fig. 1a is a fragmentary perspective view of a slightly modified overshoe made according to the invention;

Fig. 2 shows the lower half of a mold according to the invention in view, with the molding core therein.

Fig. 3 shows a cross section of the mold taken along the line 3—3 of Fig. 2;

Fig. 4 is a cross-sectional view taken along the line 4—4 of Fig. 2.

As can be seen from Fig. 1 the overshoe consists of an upper 1 which shows a reinforcement 2 above the hollow heel part 3. The upper is attached directly to the sole 4. A flap 5 serves as fastening device, which covers one side of the upper 1 when closed and which is kept fastened by means of the snap fastener parts 6 and 7. It has to be observed that, when the shoe is closed, there must be sufficient overlapping also at the source of the flap, so that neither rain nor moisture can enter. It is an object of the invention to provide at this point an enlargement of the upper, which when the shoe is closed, forms a pleat under the flap.

This enlargement at the source of the flap 5 has the reference 1' in Fig. 1a. It is advisable that this enlargement as shown on the drawing has already in the open state an embossed line, which will facilitate the formation of the pleat when closing. In most cases however it is sufficient to provide a simple enlargement of the upper or a lengthening of same which extends a little upwards, so that already at the source of the flap there is substantial overlapping of the other parts of the upper.

Shoes of the type described above are suitably molded in molds, which consists of a bottom part 8, an upper part 8' and a molding core 9.

The parting of this mold is essentially generally along the longitudinal plane of the shoe, as shown on Figs. 2 and 3.

The parts of the mold corresponding to the flap lie according to the invention each wholly on one side of the parting i. e. one only in the lower part and the other only in the upper part. This cavity has the reference 10 on Fig. 2.

It will be noted that the mold cavity is located in part between the molding core 9 and the enclosing mold parts 8 and 8', whereas a portion of said mold cavity, that portion which forms the closing flap, is located between the respective enclosing mold parts 8 and 8'.

The molding core, which as mentioned above is deformed as compared to the desired shape of the finished fastened shoe, is provided with a handle 13 and is shown as having a groove 11.

For the manufacture of a shoe at first the lining, which in most cases is made of jersey and which is previously sewn into a kind of sock, is put on the molding core 9. According to the invention the lining is then tightened and is kept in the tightened position by means of an elastic ring or any other means, which are put into the groove 11.

It is essential that at the beginning of the molding process the lining is very tightly held. It is a further object of the invention that the eventual seams of the lining sock are not within the spew line of the shoe.

By these two measures it is obtained, that the movement of the rubber resulting from the molding process does not cause any pleats or other disturbances in the position of the lining.

The position of the lining seams outside the area of the spew lines of the shoe is characteristic for the footwear according to the invention, as it can always be ascertained on the finished article.

The lining, which as stated above, has been previously sewn into a form simulating a sock, is covered with a rubber compound of any of the usual compositions and it is then put into one half of the mold.

Dowels 12 make it possible to put on the other half in the proper position. The molding core is kept in the correct position in the closed mold by a projection 14, so that the upper and lower half of the shoe have the same thickness. The rubber in the closed mold is then vulcanised in the usual manner under pressure and heat.

The invention is not restricted to ladies overshoes, but can be employed for all footwear, for which overlapping fastening flaps are required.

It is to be understood that the method and apparatus described is not limited to use in producing ladies' overshoes but may of course be used equally well for producing men's and children's shoes and boots, as well as boots adapted for use by animals as those used for prevention of hoof and mouth disease and for other purposes, i. e., on any type of footwear having a flap which is intended to overlie another part of the shoe for attachment thereto.

The term "source" employed in the foregoing description means in every case the lower end of the flap.

The deformed molding core, as mentioned above, may have as shown in the drawing, only a small projection molding a connection to the overlapping part of the shoe, which in this case is molded by corresponding parts of the bottom and the upper half of the mold.

In other cases one of the parts molding the overlapping flap may be partly or wholly on the molding core.

The core with projections and/or other deformations may be used not only for molding purposes under heat and pressure, as described before, but may also advantageously be used for any manufacture of footwear by other molding processes such as dipping, enabling the formation in one operation of the upper and the overlapping flap.

The invention extends, as can be seen from the foregoing to any kind of molded rubber footwear irrespective of whether the molding is done by heat and pressure or by any other process.

What I claim is:

1. The process of manufacturing rubber shoes having an upper formed with an opening at its front, a flap integrally attached to the upper at one side of said opening and adapted to overlie said opening and to overlap and to be temporarily attached to the upper at the other side of said opening, comprising the steps of covering a molding core with a layer of rubber compound, putting the core into a mold formed by at least two enclosing mold parts, which mold has a continuous molding cavity located in part between said core and said mold parts to mold the sole and upper and in part between said respective mold parts away from said core to mold said flap, placing additional rubber compound in the last mentioned part of said cavity, and molding and vulcanizing the rubber compound under heat and pressure, whereby a rubber shoe is formed having a sole and upper and a flap attached to said upper, which flap may in use be bent to overlap and to be attached to another part of the upper.

2. A mold for manufacturing rubber shoes having an upper formed with an opening at its front and a flap integrally attached to the upper at one side of said opening and adapted to overlie said opening and to overlap and to be temporarily attached to the upper at the other side of said opening, comprising a molding core having an external surface conformation approximating the desired internal surface conformation of the shoe, an enclosing mold comprising at least two enclosing mold parts, said enclosing mold parts being so formed as to provide a continuous molding cavity located in part between said core and said mold parts to mold the sole and upper and in part between said respective mold parts away from said core to mold the said flap, said second mold part being bounded by a surface which is an extension of the surface of the main mold part so that a continuous surface ornamentation may be provided on said surfaces and therefore on the shoe upper and on the closing flap, whereby when rubber compound is placed between said molding core and the enclosing mold parts and in that part of the cavity between the enclosing mold parts, and the rubber compound is vulcanized under heat and pressure, a rubber shoe is formed having a sole and upper and a flap attached at one side to said upper, which flap may in use be bent to overlap and to be attached to another part of the upper.

ERNST ROLLMANN.